United States Patent [19]

Shimizu et al.

[11] Patent Number: 5,495,350
[45] Date of Patent: Feb. 27, 1996

[54] COLOR IMAGE PROCESSOR WHICH CORRECTS SPATIAL AND FREQUENCY CHARACTERISTICS OF COLOR COMPONENTS

[75] Inventors: Hideaki Shimizu, Yokohama; Hidenori Ozaki, Kawasaki, both of Japan

[73] Assignee: Canon Kabushiki Kaisha, Tokyo, Japan

[21] Appl. No.: 925,660

[22] Filed: Aug. 7, 1992

[30] Foreign Application Priority Data

Aug. 9, 1991 [JP] Japan .................... 3-225077

[51] Int. Cl.⁶ .................... G03F 3/08; H04N 1/46
[52] U.S. Cl. .................... 358/521; 358/525; 358/458
[58] Field of Search .................... 358/458, 521, 358/525

[56] References Cited

U.S. PATENT DOCUMENTS

| | | | |
|---|---|---|---|
| 4,595,958 | 6/1986 | Anderson, Jr. et al. | 358/525 |
| 4,672,433 | 6/1987 | Yamamoto et al. | 358/525 |
| 4,712,141 | 12/1987 | Tomohisa et al. | 358/280 |
| 4,864,357 | 9/1989 | Matsunawa et al. | 358/521 |
| 4,992,860 | 2/1991 | Hamaguchi et al. | 358/458 |
| 5,166,809 | 11/1992 | Surbrook | 358/525 |
| 5,327,257 | 7/1994 | Hrytzak et al. | 358/447 |
| 5,339,171 | 8/1994 | Fujisawa et al. | 358/458 |

Primary Examiner—Peter S. Wong
Assistant Examiner—Randy W. Gibson
Attorney, Agent, or Firm—Fitzpatrick, Cella, Harper & Scinto

[57] ABSTRACT

An image reading apparatus which can eliminate a difference of the MTF occurring due to the matching of the positions of the pixels and can perform an accurate color discrimination and can obtain a high image quantity. An image on an original is read through color separation filters of a plurality of colors. By executing position correction arithmetic operations with respect to all of the color pixels which have been read, the pixel positions are corrected without a deviation, thereby setting the MTF of each color pixel to the same level. In the position correction arithmetic operations, by setting a plurality of virtual pixels with respect to each color every pixel on boundaries of different color pixels and by executing the interpolation arithmetic operations, not only the positions can be corrected but also the resolution can be improved.

15 Claims, 10 Drawing Sheets

COLOR IMAGE PROCESSOR WHICH CORRECTS SPATIAL AND FREQUENCY CHARACTERISTICS OF COLOR COMPONENTS

BACKGROUND OF THE INVENTION

1. Field of the Invention

The invention relates to an image processing apparatus for performing a position correcting operation and a correcting operation of spatial frequency characteristics for a plurality of input color component signals.

2. Related Background Art

Hitherto, there has been provided an image reading apparatus having a color separating function by arranging optical filters of different spectral characteristics in front of line sensors to read an image.

In such an image reading apparatus, a method of correcting a positional deviation due to an interpolating operation in order to correct a color deviation which occurs due to differences of the original reading positions of respective colors is known.

Figure 13:
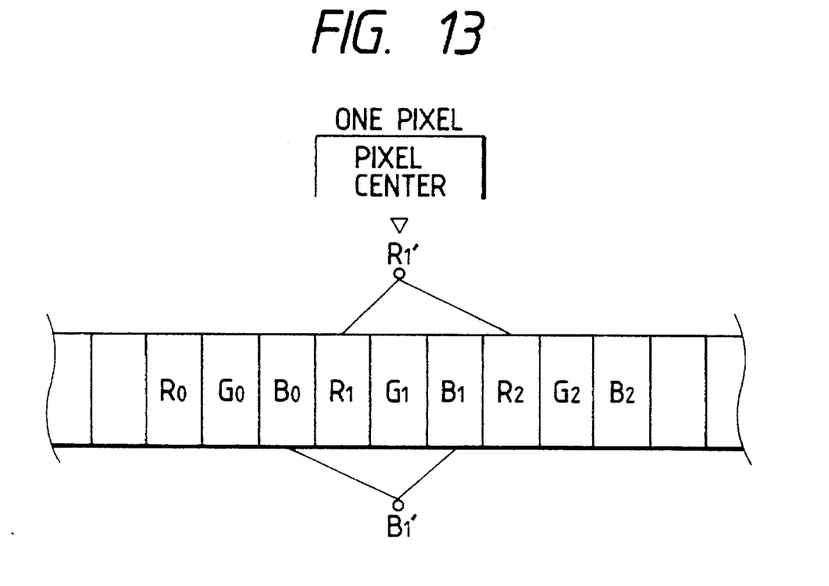
FIG. 13 is a diagram for explaining the principle of the correction of a positional deviation in the conventional inline sensor coated with the three color filters of R, G, and B.

FIG. 13 is a diagram for explaining the principle of the correction of such a positional deviation.

In the line sensor coated with filters of red (R), green (G), and blue (B) as shown in the diagram, R, G, and B are regarded as one pixel. Therefore, in order to make the positions of R and B coincide with the position of G, by weighting ⅓ and ⅔ to the adjacent two pixels, the pixels of the respective colors can be falsely set to the same position.

In the case of matching the positions of the pixels by the above conventional method, however, when the color is discriminated every pixel from the ratios of the respective color components, a difference of MTF (spatial frequency transmitting characteristics) occurs, so that there frequently occurs a case where the color cannot be accurately discriminated. Such a problem occurs because since the interpolating operation is not performed to the pixel of G, the MTF of the color of the G pixel is remained to be higher than the MTFs of the other colors.

That is, when the positional deviation is merely corrected, the MTF of the respective color component signals are not matched, so that there occurs a problem such that the signals are not suitable for the color discrimination in such a state.

SUMMARY OF THE INVENTION

The invention is made in consideration of the above conventional apparatus and it is an object of the invention to form color component signals suitable for color image processes.

To accomplish the above object, according to the invention, there is provided an image processing apparatus comprising: supplying means for supplying a plurality of color component signals, each of which representing pixels of different spatial locations; and correcting means for simultaneously correcting both of the spatial locations and spatial frequency characteristics of the color component signals.

Another object of the invention is to execute proper corrections to signals from a line sensor on which filters of different characteristics are alternately arranged.

To accomplish the above object, according to the invention, there is provided an image processing apparatus comprising: a line sensor for generating a plurality of color component signals, in which the line sensor is constructed by alternately arranging filters of different characteristics corresponding to the respective color component signals on one line; and correcting means for simultaneously correcting both of spatial locations and spatial frequency characteristics of the color component signals.

Still another object of the invention is to accurately correct pixel signals at a high speed.

Further another object of the invention is to accurately perform a color discrimination.

Further another object of the invention is to obtain a reproduction image of a good image quality.

Further another object of the invention is to improve a copying apparatus in which an analog image formation and a digital image formation are combined.

The above and other objects and features of the present invention will become apparent from the following detailed description and the appended claims with reference to the accompanying drawings.

DETAILED DESCRIPTION OF THE PREFERRED EMBODIMENTS

Figure 1:
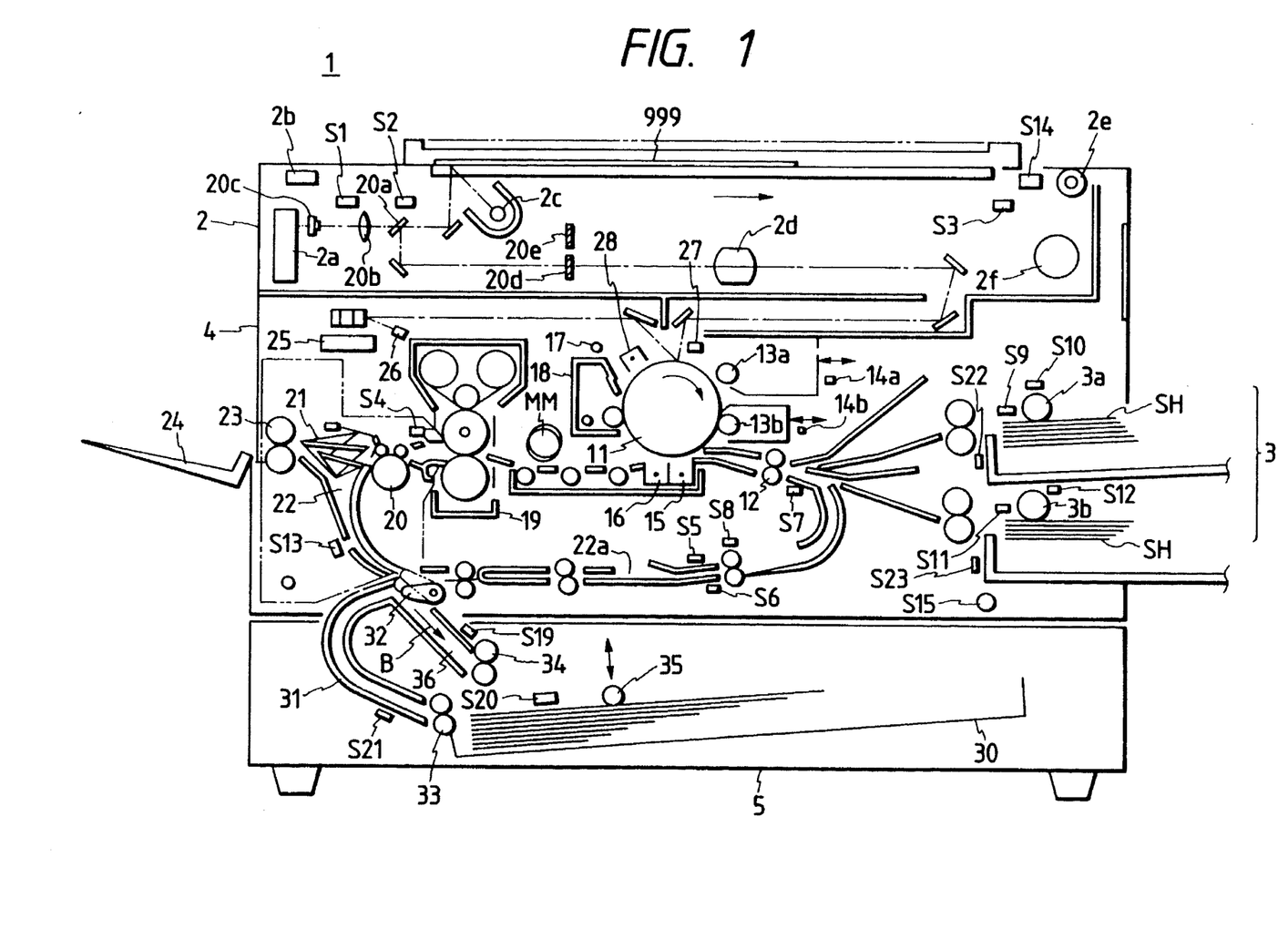
FIG. 1 is a cross sectional constructional diagram showing a construction of a copying apparatus in an embodiment of the invention.

FIG. 1 is a cross sectional constructional diagram showing an image forming apparatus according to an embodiment of the invention.

A copying apparatus main body 1 comprises an original scan unit 2, a paper feed unit 3, an image recording unit 4, an intermediate tray unit 5, and the like.

The construction of the original scan unit 2 will be first explained.

A controller 2a comprises means for integratedly controlling a copy sequence and image processing means for processing an image signal read by a CCD line sensor 20c.

A power switch 2b and an original exposing lamp 2c construct a scan mirror and an optical scan system and scan and move at a predetermined speed.

A transmission light of a half mirror 20a passes through a CCD imaging lens 20b and is photoelectrically converted by the CCD line sensor 20c and is sent as an image electric signal to the image processing means of the controller 2a. The details will be explained hereinlater.

The reflected light of the half mirror 20a passes through a red filter 20d to eliminate the red color, or a blue filter 20e to eliminate the blue color, or a path without using a filter and a shutter and is sent to an imaging lens 2d.

The imaging lens 2d forms an image of the reflected light of the half mirror 20a onto a photosensitive drum 11 of the image recording unit 4. That is, in the apparatus of the embodiment, an analog image is recorded.

A buzzer 2e alarms and informs a copy mode error or the like which has been set in an operation unit, which will be explained hereinlater. An optical system drive motor 2f drives the optical scan system or the like at a high precision.

The paper feed unit 3 feeds a cut sheet SH into the image recording unit 4 by the driving of feed rollers 3a and 3b.

The construction of the image recording unit 4 will now be described.

A resist roller 12 once stops the cut sheet SH fed by the driving of the feed rollers 3a and 3b and sets the synchronization to match the front edge of the image and, thereafter, again feeds the cut sheet SH.

Development units 13a and 13b enclose the developing agents of respective colors (red, black). Either one of the development units 13a and 13b is selectively arranged near the photosensitive drum 11 by the driving of solenoids 14a and 14b, while the other development unit is arranged at a remote position away from the drum 11.

In case of performing the multiplex development, the controller 2a controls the driving of the solenoids 14a and 14b.

A copy transfer charging device 15 transfers the toner images developed by the development units 13a and 13b onto the cut sheet SH. After the toner images were transferred, the cut sheet SH is separated from the photosensitive drum 11 by a separation charging device 16.

A pre-exposing lamp 17 neutralizes the surface potential of the drum 11, thereby preparing for the primary charging operation. A cleaner device 18 is constructed by a cleaning blade and a cleaning roller and collects the toners remaining on the drum 11.

A fixing device 19 fixes the toner images transferred onto the cut sheet SH by a heat and a pressure. A conveying roller 20 conveys the cut sheet SH whose fixing process has been finished to a discharge tray 24.

In the multiple copy mode, a flapper 21 has been switched to the position shown by a broken line by the operation of a solenoid (not shown). The cut sheet SH which has been fed, copy transferred, separated, and fixed passes on a conveying path 22 and is sequentially conveyed in a conveying direction 22a. After the paper was detected by a sensor $S_5$, it is detected by sensors $S_6$ and $S_8$ and the position in the lateral direction of the paper is matched by a solenoid for lateral resist matching.

The resist roller 12 is driven by a multiple copy command from an operation unit 41, thereby sending the cut sheet SH to the position of the resist roller 12.

After that, the cut sheet SH is discharged to the discharge tray 24 in a manner similar to the foregoing operation.

In the two-sided copy mode, the copy transfer sheet is discharged by a discharge roller 23 in a manner similar to the case of the ordinary copy operation until the midway. However, after the rear edge of the cut sheet SH passed through the flapper 21, the discharge roller 23 is reversely driven, so that the cut sheet SH is guided by the flapper 21 and sent to the conveying path 22. The reversing driving of the discharge roller 23 is performed by a solenoid to control the forward/reverse rotation.

The subsequent operations are similar to those in the above multiplex copy mode.

As mentioned above, in the two-sided copy mode, the cut sheet SH is once discharged out of the apparatus from the discharge roller 23 and the front/back sides of the cut sheet SH are reversed by the reversing driving of the discharge roller 23 and the cut sheet is sent in the conveying direction 22a.

Although the multiplex copy mode and two-sided copy mode of a single copy sheet have been described, the intermediate tray unit 5 is used in the multiplex copy mode or the two-sided copy mode of a plurality of copy sheets. As shown in FIG. 1, the intermediate tray unit 5 has an intermediate tray 30 to temporarily enclose the cut sheet SH locating on a conveying path 31. In the multiplex copy mode of a plurality of copy sheets, the fixed cut sheet SH is partially discharged by the discharge roller 23 by the control similar to that in the two-sided copy mode of a single copy sheet. After that, by reversely rotating the discharge roller 23, the cut sheet SH is conveyed through the conveying path 22, a flapper 32, and a conveying path 36 and is enclosed onto the intermediate tray 30.

After all of the cut sheets SH after completion of the copy of the first side were enclosed onto the intermediate tray 30 by repeating the above operations, a feed roller 33 is driven by the next copy command, the cut sheet SH is fed, and the second side of the cut sheet SH is copied through the conveying path 36.

In case of the two-sided copy mode of a plurality of copy sheets, by the control similar to that in the multiplex copy mode of a single copy sheet, the cut sheet passes from the fixing device 19 through the conveying paths 22 and 36 by the flapper 21 and is enclosed onto the intermediate tray 30.

Since the subsequent operations are similar to those in the case of the multiplex copy mode mentioned above, their descriptions are omitted here.

A scanner motor 25 rotates a rotational polygon mirror at a predetermined speed, thereby deflecting a laser beam which is emitted from a semiconductor laser 26. A digital scan unit is constructed by the scanner motor 25, semiconductor laser 26, and the like. A laser beam corresponding to digital image information supplied from the image processing means of the controller 2a is emitted. A multiplexed image of the image obtained by the above analog image recording and the image obtained by the digital image recording is recorded. In the analog image recording mode, the operation to selectively erase the latent image by irradiating the laser beam to the latent image region recorded on the photosensitive drum 11 is also executed.

An exposure shutter 27 shuts off a part of or all of the reflected image light, thereby suppressing the latent image region. Reference numeral 28 denotes a primary charging device.

In the diagram, reference numerals $S_1$ to $S_{15}$ and $S_{19}$ to $S_{23}$ denote sensors. The sensor $S_1$ detects the home position of the optical system serving as an analog scan unit. The optical system is stopped at the home position in the standby mode.

The sensor $S_2$ detects that the optical system has been moved to the position corresponding to the front edge position of the original image. The timing of the copy sequence is controlled by an output of the sensor $S_2$.

The sensor $S_3$ detects the limiter position (inverting position) at the time of the maximum scan.

The optical system is reciprocated by the scan length according to the cassette size and magnification which are instructed by a scan unit, which will be explained hereinlater.

Figure 2:
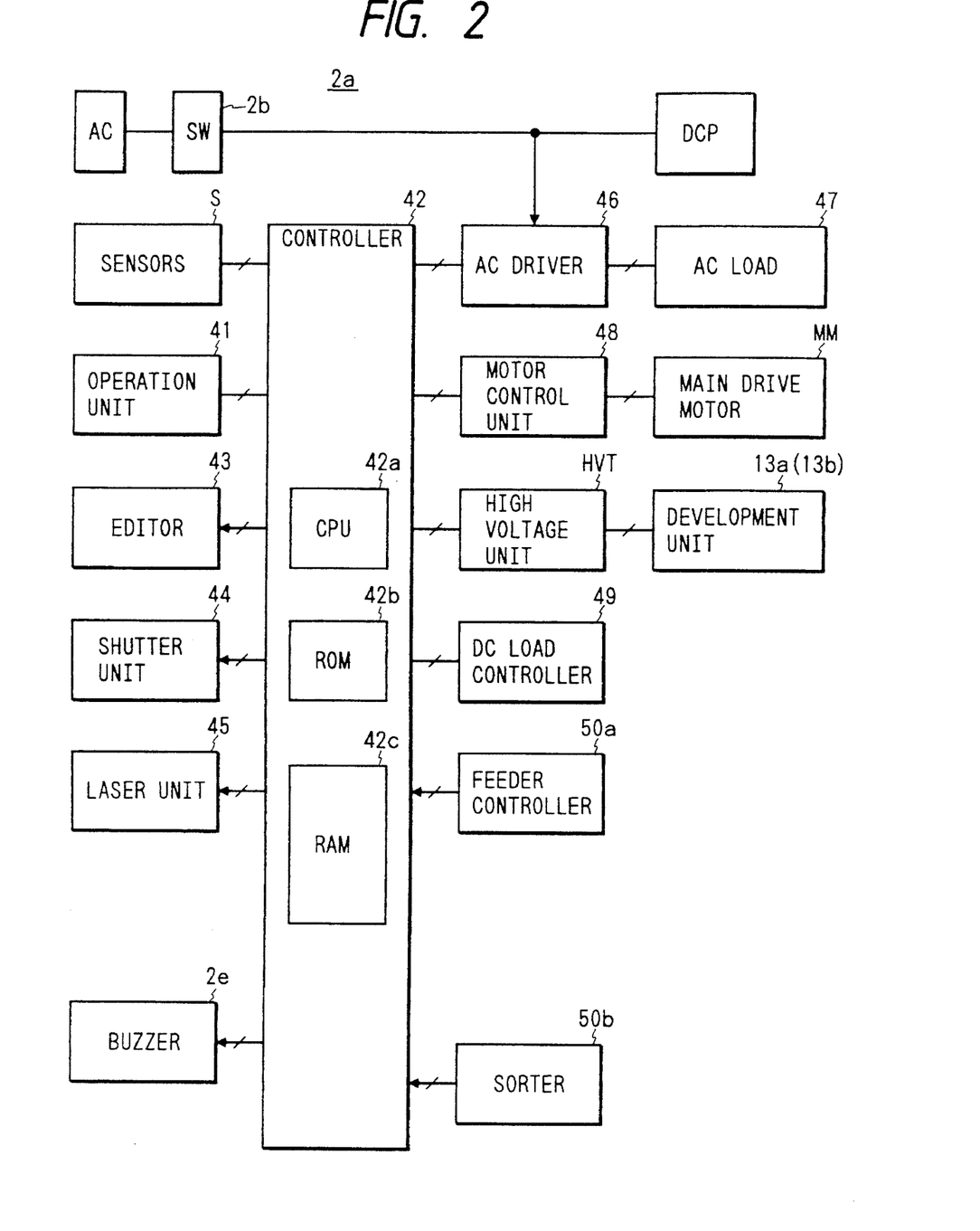
FIG. 2 is a block diagram showing a construction of a controller in the embodiment.

FIG. 2 is a block diagram showing a construction of the controller 2a shown in FIG. 1. In FIG. 2, the same parts and components as those shown in FIG. 1 are designated by the same reference numerals.

In the diagram, the operation unit 41 comprises: keys to set the copy mode (one-sided, two-sided, multiplex, etc.); first mode setting means for setting the first recording mode to multiplex the digital information which has previously been stored from the digital scan unit to the images of all of the originals which are fed from an automatic document feeder (ADF); second mode setting means for setting the second recording mode to multiplex the digital information which has previously been stored from the digital scan unit to the image of the special original which is fed from the ADF; and the like. The details will be explained hereinlater.

A controller 42 comprises a CPU 42a, an ROM 42b, an RAM 42c, and the like and integratedly controls the copy sequence on the basis of a control program stored in the ROM 42b.

An editor 43 is used to input an area designation for a predetermined area of the original. A shutter unit 44 is constructed by the exposure shutter 27 and a solenoid.

A laser unit 45 comprises the semiconductor laser 26, scanner motor 25, and the like. An AC driver 46 supplies an AC power source to an AC load 47 such as an original exposing lamp 2c or the like. A motor control unit 48 controls the driving of the motor unit. A DC load controller 49 controls the drivings of the solenoids 14a and 14b, a clutch, a fan, and the like.

A feeder controller 50a controls the driving of the original feed unit. A sorter 50b discharges the cut sheet SH which is discharged by the driving of the discharge roller 23 to the designated paper discharge bin.

A high voltage unit HVT applies voltages of predetermined potentials to the charging system and the development sleeves of the development units 13a and 13b.

A DC power supply DCP supplies a control voltage of +5 V to the controller 2a and the like.

When the power switch 2b is turned on, a current is first supplied to a heater in the fixing device 19 and the apparatus waits until a temperature of a fixing roller reaches a predetermined temperature at which the image can be fixed (for a waiting time.). When the temperature of fixing roller reaches the predetermined temperature, a main drive motor MM is driven for a predetermined time, and the photosensitive drum 11, the fixing device 19, and the like are driven, and the temperature of roller in the fixing device 19 is set to a uniform temperature (wait cancelling rotation). After that, the main drive motor MM is stopped and the apparatus waits in a state in which the copying operation can be executed (standby mode). The main drive motor MM drives the photosensitive drum 11, fixing device 19, development units 13a and 13b, and various kinds of rollers to convey the copy transfer paper. When the copy command is supplied from the operation unit 41, the copy sequence is started. The whole construction and the outline of the operations of the image recording apparatus of the embodiment are as described above.

The operation in the image recording mode will now be described in detail.

In the ordinary image recording mode, the latent image is formed on the drum 11 without using the optical filters 20d and 20e. In this instance, the laser 26 irradiates a laser beam to an arbitrary area in the preset image and can also erase a part of the image. In the case where an erasing mode of a red zone color is selected, the optical red filter 20d is set onto the path of the reflected light from the original, the red zone color is erased, and the image is recorded. Similarly, the blue zone color is erased by using the optical blue filter 20e.

Examples of processes in the case where the red and black colors are automatically separated will now be described hereinbelow in accordance with the following order.

1. Latent image of black image
2. Development of black image
3. Latent image of red image
4. Development of red image 1. Latent image of black image The latent image of the black image onto the drum 11 will be described with reference to FIGS. 1 and 3.

Figure 3:
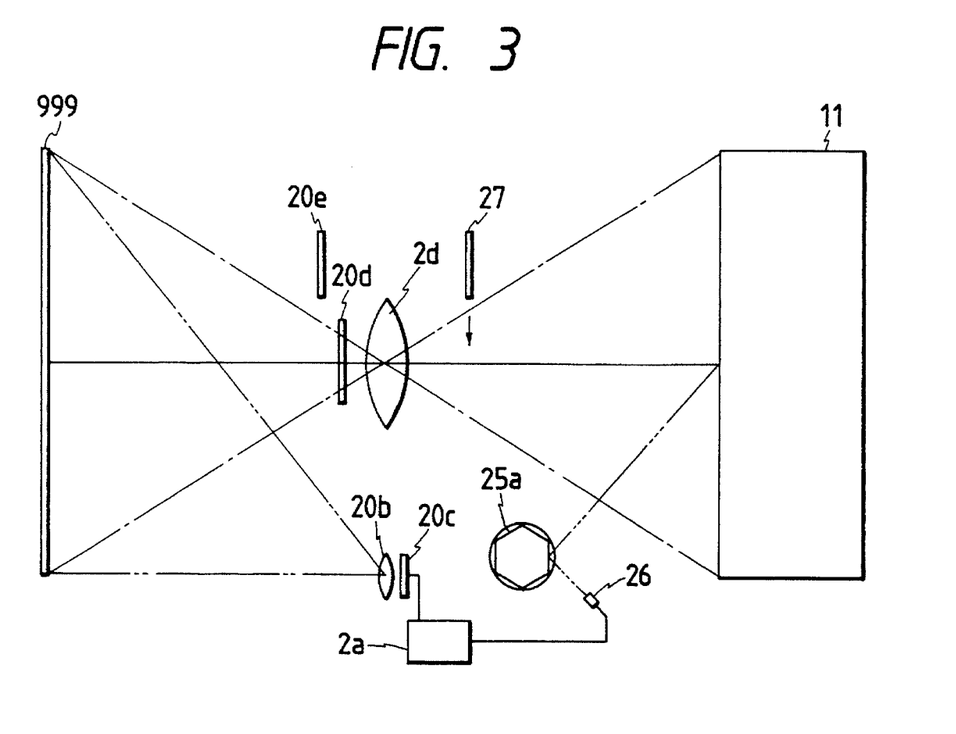
FIG. 3 is a side elevational view showing a construction of an original scan unit in the embodiment.

First, as an operation prior to forming the latent image of the black image, the optical red filter 20d is set in front of the image lens 2d.

An original 999 including red information is irradiated by the original exposing lamp 2c and scan mirror. The lamp 2c and scan mirror are moved in the direction of an arrow b in FIG. 1 by the optical system drive motor (optical motor) 2f.

After the reflected light from the original 999 was reflected by the half mirror 20a, it enters the optical red filter 20d. The red filter 20d erase the red information in the original 999.

The reflected light from the original 999 from which the red information has been erased passes through the imaging lens 2d and is formed as an image onto the drum 11.

A latent image of the other information excluding the red information of the original 999 is formed onto the drum 11.

2. Development of black image

The development of the black image will now be described with reference to FIGS. 1 and 3. The cut sheet SH is fed by the feed rollers 3a and 3b and conveyed into the image recording unit 4.

The latent image excluding the red information on the drum 11 is developed by the black development unit 13a and is transferred onto the cut sheet SH. After it was transferred, the cut sheet SH is separated from the drum 11 by the separation charging device 16. The toner remaining on the drum 11 is collected by the cleaner device 18.

The developed black toner image on the cut sheet SH separated is subsequently fixed by the heat and pressure by the fixing device 19.

The cut sheet SH on which the black information has been recorded is conveyed to the conveying path 22 by the flapper 21 in order to perform the next development. The cut sheet SH is conveyed from the conveying path 22 to the resist roller 12 through the conveying path 22a.

3. Latent image of red image

The latent image of the red image onto the drum 11 will now be described.

As an operation prior to forming the latent image of the red image, the shutter 27 is closed. By closing the shutter 27, the optical information from the imaging lens is shut off.

The original 999 is irradiated by the original exposing lamp 2c and scan mirror. The lamp 2c and scan mirror are moved in the direction of an arrow a in FIG. 1 by the optical system drive motor (optical motor) 2f. The reflected light from the original 999 passes through the half mirror 20a and is formed as an image onto the CCD line sensor 20c through the lens 20b.

Figure 4:
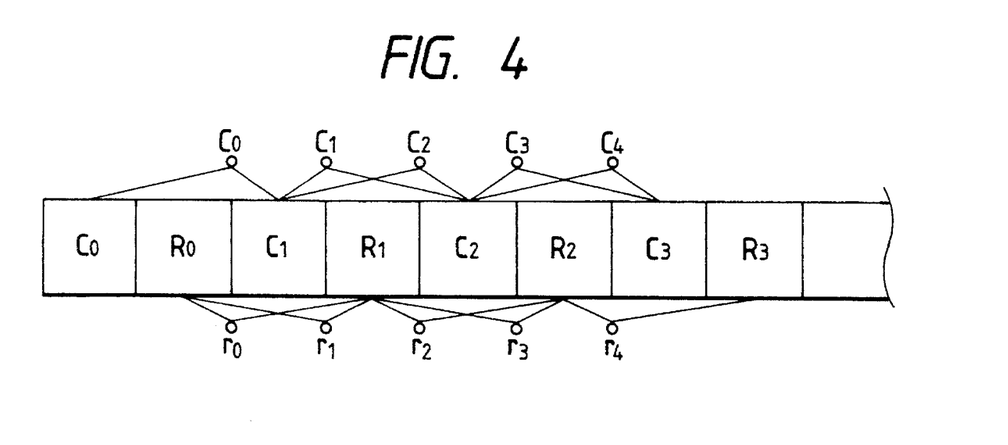
FIG. 4 is a diagram showing a construction of a CCD line sensor in the embodiment.

FIG. 4 is a diagram showing a construction of the CCD line sensor 20c in the embodiment.

As shown in the diagram, red optical filters and cyan optical filters are alternately attached to the CCD line sensor 20c. After the reflected light of the original passed through the lens 20b, it is separated in two directions by a prism (not shown). One of them passes through the cyan filters and is formed as an image onto the CCD line sensor 20c. The other light passes through the red filters and is formed as an image onto the sensor 20c. The charges accumulated in the CCD line sensor 20c for a predetermined time are transferred in a lump to a shift register (not shown) with respect to all of the pixels and are generated as an image signal by shift clocks CLK.

The image signal from the CCD line sensor 20c is supplied as an analog electric signal to the controller 2a.

Figure 5:
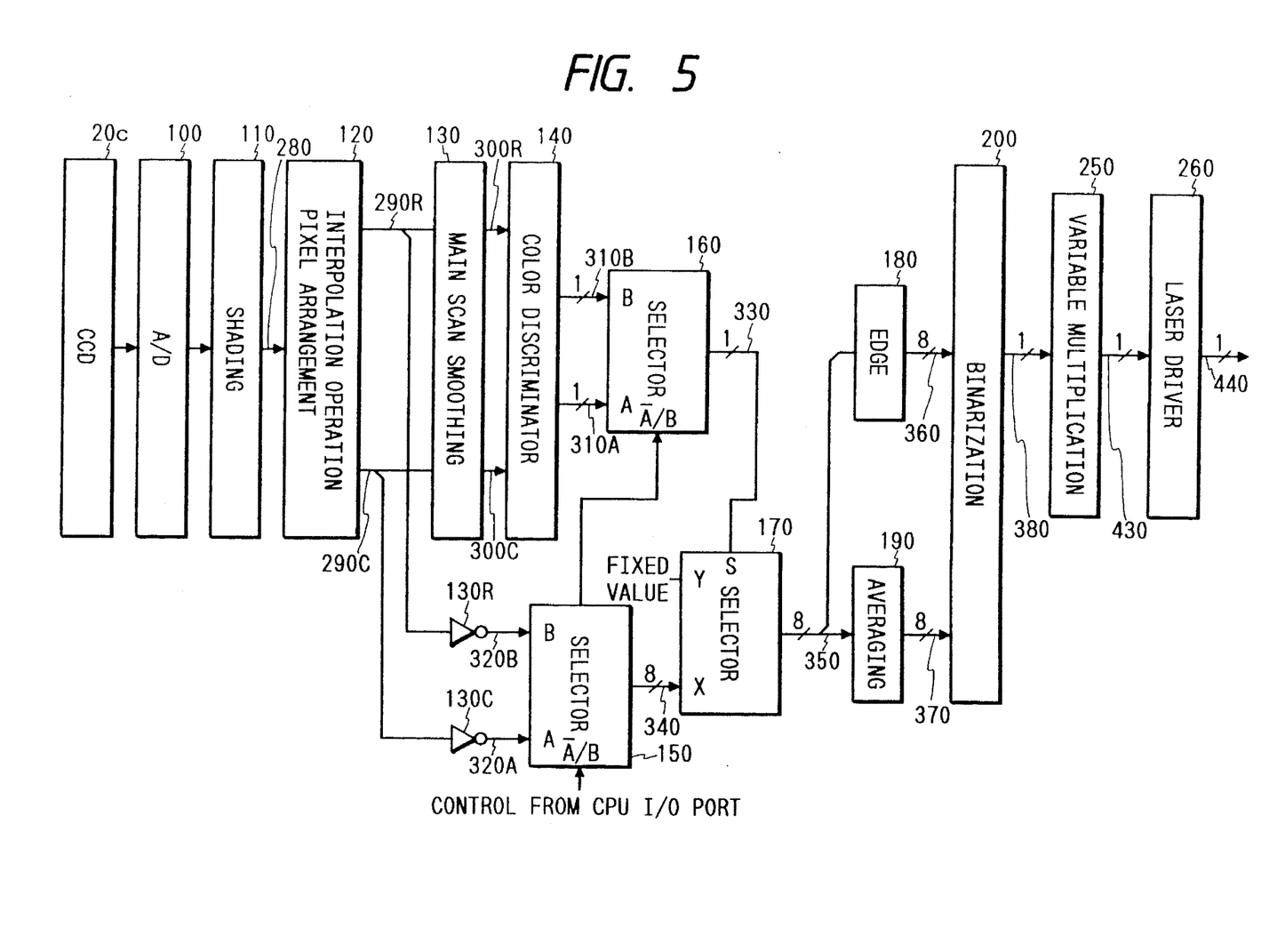
FIG. 5 is a block diagram showing an image processing unit of a controller in the embodiment.

FIG. 5 is a block diagram showing an image processing unit in the controller 2a.

The image signals (R signal and C signal) from the CCD line sensor 20c are analog/digital converted into the 8-bit digital signals by an A/D converter 100. An output signal from the A/D converter 100 is supplied to a shading circuit 110. A sensitivity variation of the CCD line sensor 20c, a light amount variation of the original exposing lamp 2c, and the like are corrected by the shading circuit 110.

An output signal 280 of the shading circuit 110 is supplied to an interpolation operation pixel arrangement circuit 120, by which the positions of the red and cyan pixels mentioned above are corrected.

That is, virtual pixels ($r_0$, $r_1$, $r_2$, ...) are obtained from the red pixels ($R_0$, $R_1$, $R_2$, ...) in FIG. 4 and virtual pixels ($c_0$, $c_1$, $c_2$, ...) are obtained from the cyan pixels ($C_0$, $C_1$, $C_2$, ...).

As mentioned above, the weighting arithmetic operation of $r_n=(3R_n+R_{n+1})/4$ or $r_m=(R_{m-1}+3R_m)/4$ is executed with respect to each of the red virtual pixels. Similarly, the weighting arithmetic operation of $c_n=(C_n+3C_{n+1})/4$ or $c_m=(3C_{m-1}+C_m)/4$ is executed with respect to each of the cyan virtual pixels. In this instance, n=0, 2, 4, ... and m=1, 3, 5, ....

The information of the virtual pixels is obtained from the two pixel information of the line sensor 20c by the linear interpolation arithmetic operation by the weighting process.

Particularly, since the interpolation operation pixel arrangement circuit 120 performs the interpolation arithmetic operation for correction of the pixel positions without a deviation with regard to both of red and cyan, the similar MTF for red and cyan can be realized without causing a difference of the MTF which is apt to occur due to such an interpolation operation.

Moreover, in the interpolation operation, since two virtual pixels are provided with respect to each pixel as shown in FIG. 4, this results in that the number of pixels is doubled. Therefore, the interpolation operation pixel arrangement circuit 120 provides an effect to double the resolution of the image while correcting the pixel positions.

Figure 6:
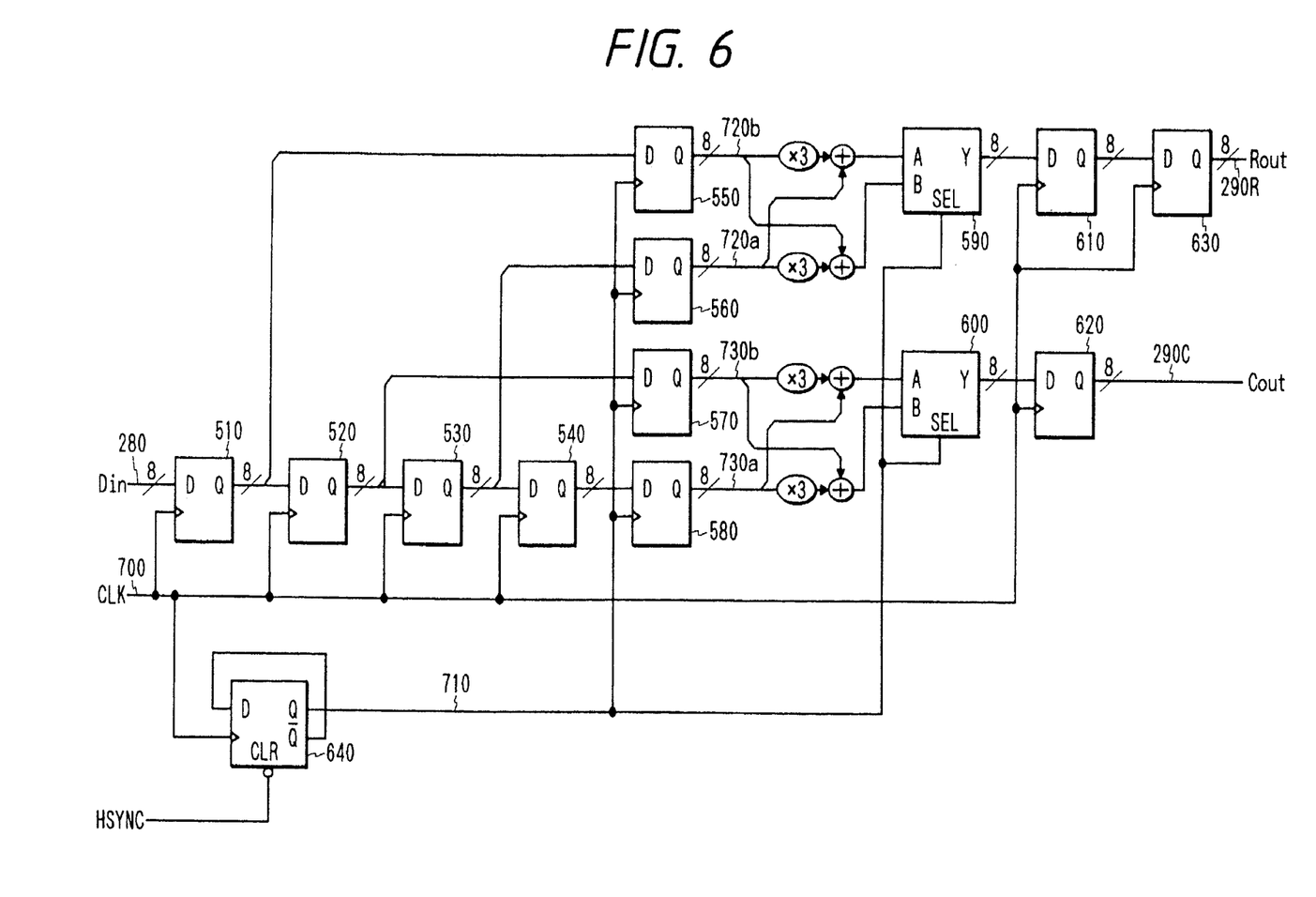
FIG. 6 is a circuit diagram showing a construction of a hardware of an interpolation operation pixel arrangement circuit in the embodiment.

FIG. 6 is a circuit diagram showing a construction of a hardware of the interpolation operation pixel arrangement circuit 120.

In the image signal 280 of eight bits from the shading circuit 110, the R and C signals are alternately transmitted synchronously with the clocks and the 8-bit image signal is sequentially supplied to D flip-flops 510, 520, 530, and 540 and the signals of four pixels are latched therein.

The latch signals are further sent to D flip-flops 550, 560, 570, and 580. The D flip-flops 550, 560, 570, and 580 are synchronized by a frequency division signal 710 obtained by frequency dividing a clock signal 700 by a D flip-flop 640. The red image information in the image information is latched into the D flip-flops 550 and 560. The image information of cyan is latched into the D flip-flops 570 and 580. With respect to red image information 720a and 720b latched in the D flip-flops 550 and 560, the following arithmetic operations are performed.

$$A=720a+720b\times 3$$

$$B=720a\times 3+720b$$

Lower two bits in the results of the operations are omitted and the image information is reduced into ¼ and supplied to a selector 590. With respect to cyan image information 720c and 720d, similar arithmetic operations are also executed and the resultant image information of ¼ is supplied to a selector 600.

The selectors 590 and 600 alternately select the results of the arithmetic operations A and B by the signal 710 and supply to D flip-flops 610 and 620 for waveform shaping. A D flip-flop 630 is used to coincide the timings of the pixels of the R and C signals.

The interpolation operation pixel arrangement is executed as mentioned above and a red signal 290R and a cyan signal 290C are generated. As shown in FIG. 5, the output signals 290R and 290C are supplied to a main scan smoothing circuit 130 and inverting circuits 130R and 130C.

First, the main scan smoothing circuit 130 executes smoothing processes of five pixels with respect to the red signal 290R and cyan signal 290C, thereby eliminating the noise components in the main scan direction in the image information, thereby preventing an erroneous judgment in the color discrimination.

According to the arithmetic operation in the smoothing processes, when the pixel data exists in the main scan direction in accordance with the order of d, b, a, c, and e, weights are set to 1, 2, 2, 2, and 1, and the value of the target pixel a is obtained by a=⅛ (d+2b+2a+2c+e).

Figure 7:
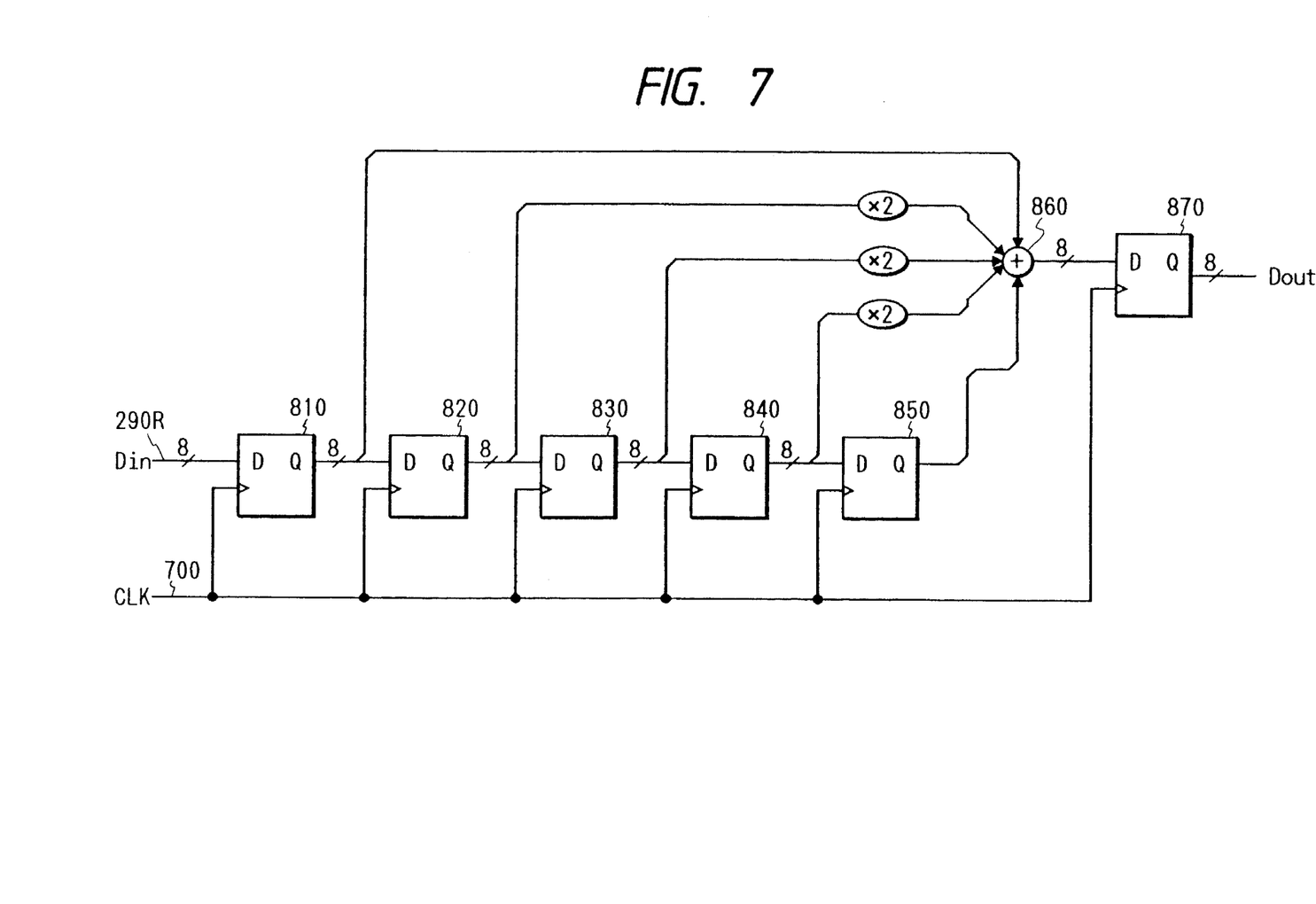
FIG. 7 is a circuit diagram showing a construction of a hardware of a main scan smoothing circuit in the embodiment.

FIG. 7 is a circuit diagram showing a construction of a hardware of the main scan smoothing circuit 130.

As for the smoothing processes, since the independent common process is executed for the R and C signals, the case of the R signal will now be described.

The red signal 290R generated from the interpolation operation pixel arrangement circuit 120 is supplied to flip-flops 810, 820, 830, 840, and 850 of the main scan smoothing circuit 130 synchronously with the clocks 700 and the signals of five pixels are latched. The above weights of 1, 2, 2, 2, and 1 are added to the latched data and the resultant weighted data is added by an adder 860. Lower three bits are omitted and the information amount is reduced into ⅛. An output signal of the adder 860 is supplied to a D flip-flop 870 and the timings are matched and an image signal 300R is generated. In case of cyan, an image signal 300C is also generated in a manner similar to the above.

The above processes have been described as an example. The practical number of pixels for smoothing and the weight coefficients are properly selected and used in accordance with the actual situation because the noise components differ depending on, for instance, the kind of line sensor or the like.

The output signals 300R and 300C from the main scan smoothing circuit 130 which have been processed as mentioned above are supplied to a color discriminator 140.

The color discriminator 140 generates color discrimination signals 310A, 310B, and 310C from the red zone digital information 300R (8 bits and 256 gradations) and blue zone digital information 300C (8 bits and 256 gradations) supplied.

Figure 8:
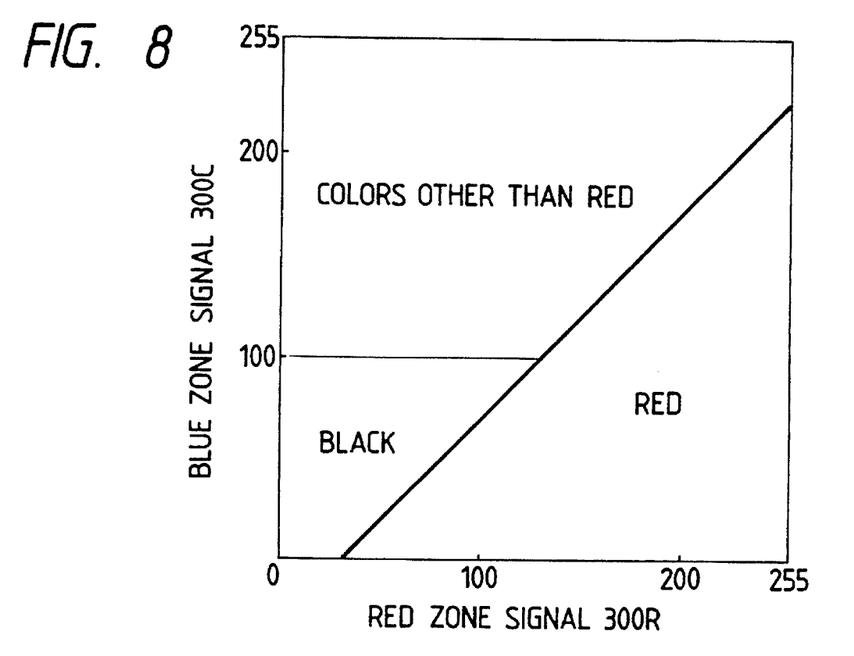
FIG. 8 is a diagram showing an LUT to form a red discrimination signal and a black discrimination signal in the embodiment.
Figure 9:
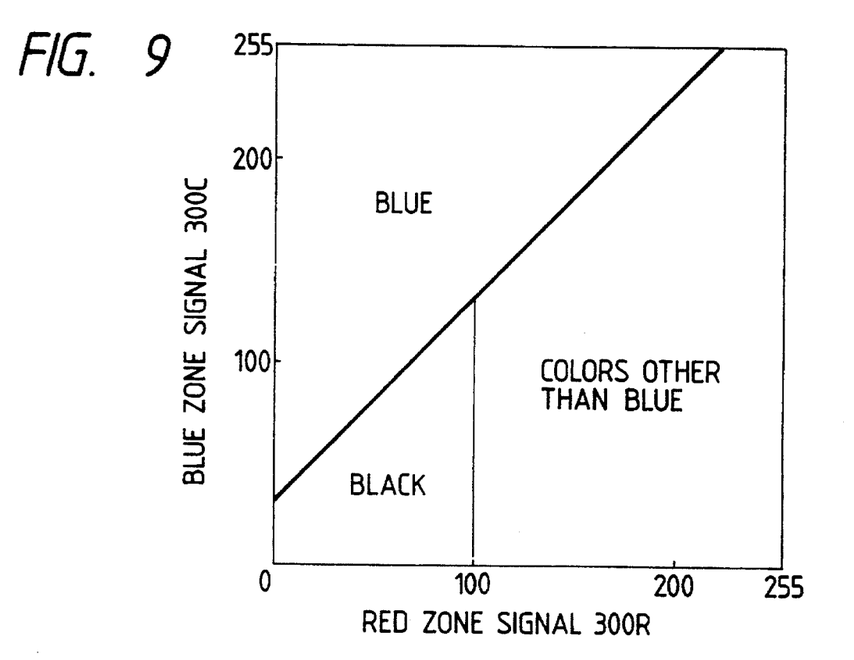
FIG. 9 is a diagram showing an LUT to form a blue discrimination signal and a black discrimination signal in the embodiment.

FIGS. 8 and 9 are graphs showing the results of the color discrimination in the color discriminator 140.

FIG. 8 is a lookup table (LUT) to form the red discrimination signal 310A and black discrimination signal 310C. FIG. 9 is a lookup table (LUT) to form the blue discrimination signal 310B and black discrimination signal 310C.

For instance, when the red signal 300R is set to "200" and the blue signal 300C is set to "100", since those values are included in the red area in FIG. 8, the red discrimination signal 310A is set to "1". On the other hand, since those values exist in the area other than the blue zone in FIG. 9, the blue discrimination signal 310B is set to "0".

The LUT in FIG. 8 is used to discriminate red and black in case of a red/black print. The LUT in FIG. 9 is used to discriminate blue and black. The contents of those tables, particularly, a method of setting the boundary lines is not limited to that shown in FIG. 8 or 9.

That is, for instance, when an area which is determined to be red in FIG. 8 is set to a large area, the range of hue which is decided to be red is also widened. Therefore, it is also possible to select a plurality of tables with different boundaries in accordance with the preferance of the user even in case of the same table for discriminating red and black.

In FIG. 5, a red zone signal 290R and a blue zone signal 290C generated from the interpolation operation pixel arrangement circuit 120 are inverted by the inverting circuits 130R and 130C and become signals 320B and 320A, respectively. Since the signal 320B is obtained by inverting the red zone luminance signal 300R, it is the cyan zone concentration signal. Since the signal 320A is obtained by inverting the blue zone luminance signal 300C, it is the red zone concentration signal.

That is, as concentration signals 320A and 320B, the signals which are not subjected to the main scan smoothing processes are used in order to execute the accurate binarization.

As mentioned above, the selectors 150 and 160 shown in FIG. 5 are controlled by an I/O port (not shown) of the CPU 42a. In case of separating the red zone color, the control line is set to "0". In case of separating the blue zone color, the control line is set to "1".

That is, when the red zone color separation is selected, the signal 310A is selected as a signal 330 and the signal 320A is selected as a signal 340.

The case of separating the red zone color, namely, the case where the control line is set to "0" will now be described hereinbelow.

Figure 10:
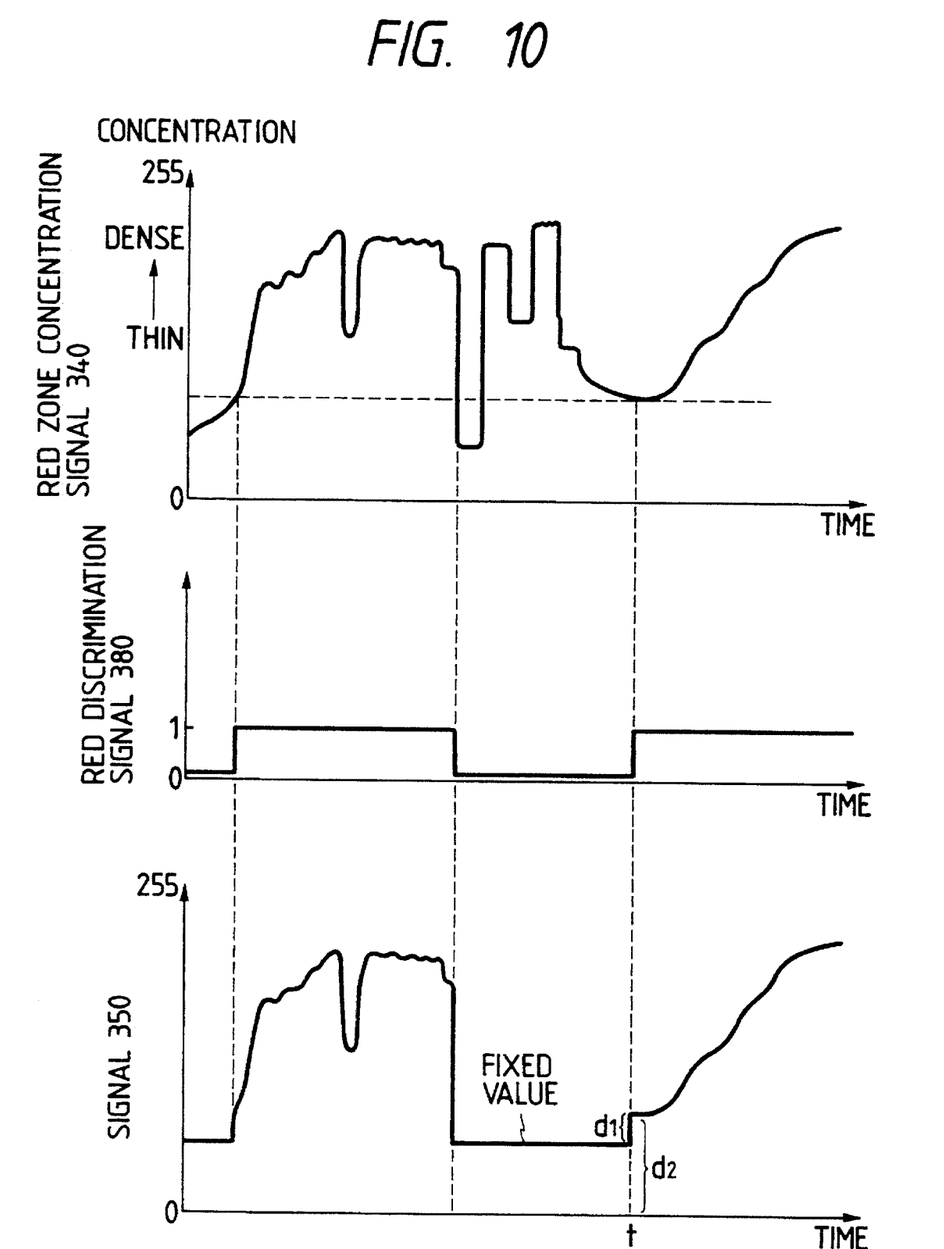
FIG. 10 is a diagram showing a selecting process of a concentration signal in the embodiment.

The red zone concentration signal 340 selected by the selector 150 is supplied to an x terminal of a selector 170 and a fixed value ("32" in the embodiment) is supplied to a y terminal. The red area signal 330 is supplied to a control terminal S of the selector 170. As shown in FIG. 10, for example, when the level of the signal supplied to the control terminal S is equal to "1", the red zone concentration signal 340 is selected. When the signal level is equal to "0", the fixed value is selected. The selected signal or fixed value is generated.

An output signal 350 from the selector 170 is supplied to an edge emphasizing circuit 180 and an averaging circuit 190.

The edge emphasizing circuit 180 is constructed by a well-known edge emphasizing filter and emphasizes the edge portion of the input signal 350. The averaging circuit 190 averages the target pixel by a matrix of 9×9 on the basis of the input signal 350.

An output signal 360 of the edge emphasizing circuit 180 and an output signal 370 of the averaging circuit 190 are supplied to a binarization circuit 220 at the next stage, respectively. The binarization circuit 200 compares the 8-bit output signal 360 of the edge emphasizing circuit 180 and the 8-bit output signal 370 of the averaging circuit 190 and generates a red signal 380 of one bit.

The sizes of filters to perform the edge emphasis and the smoothing are not limited to the above examples.

Since the edge emphasized image is binarized by using the average value as a threshold value, the binarization can be executed with a higher fidelity.

As output signal from the binarization circuit 200 is supplied to a variable magnification circuit 250 at the next stage and a predetermined magnification changing process is executed by a command from the operation unit 41. An output signal 430 of the variable magnification circuit 250 is supplied to a laser driver 260 at the next stage and is processed to drive the laser 26. The laser 26 converts an electric signal 440 from the laser driver 260 into light information. The light information is reflected by a rotational polygon mirror 25a and a latent image of the red information is formed on the drum 11.

4. Development of red image

The development of the red image will now be described with reference to FIGS. 1 and 3.

The red information latent image formed on the drum 11 by the laser 26 is developed by the development unit 13b. The cut sheet SH after completion of black development which has been conveyed to the resist roller 12 is conveyed together with the start of the original and the red toner image on the surface of the drum 11 is transferred. After the red toner image was transferred, the cut sheet SH is separated from the drum 11 by the separation charging device 16 and the red toner image on the cut sheet SH is fixed by using a heat and a pressure by the fixing device 19.

The cut sheet SH on which the black and red information has been recorded is discharged onto the discharge tray 24 by the flapper 21.

Figure 11:
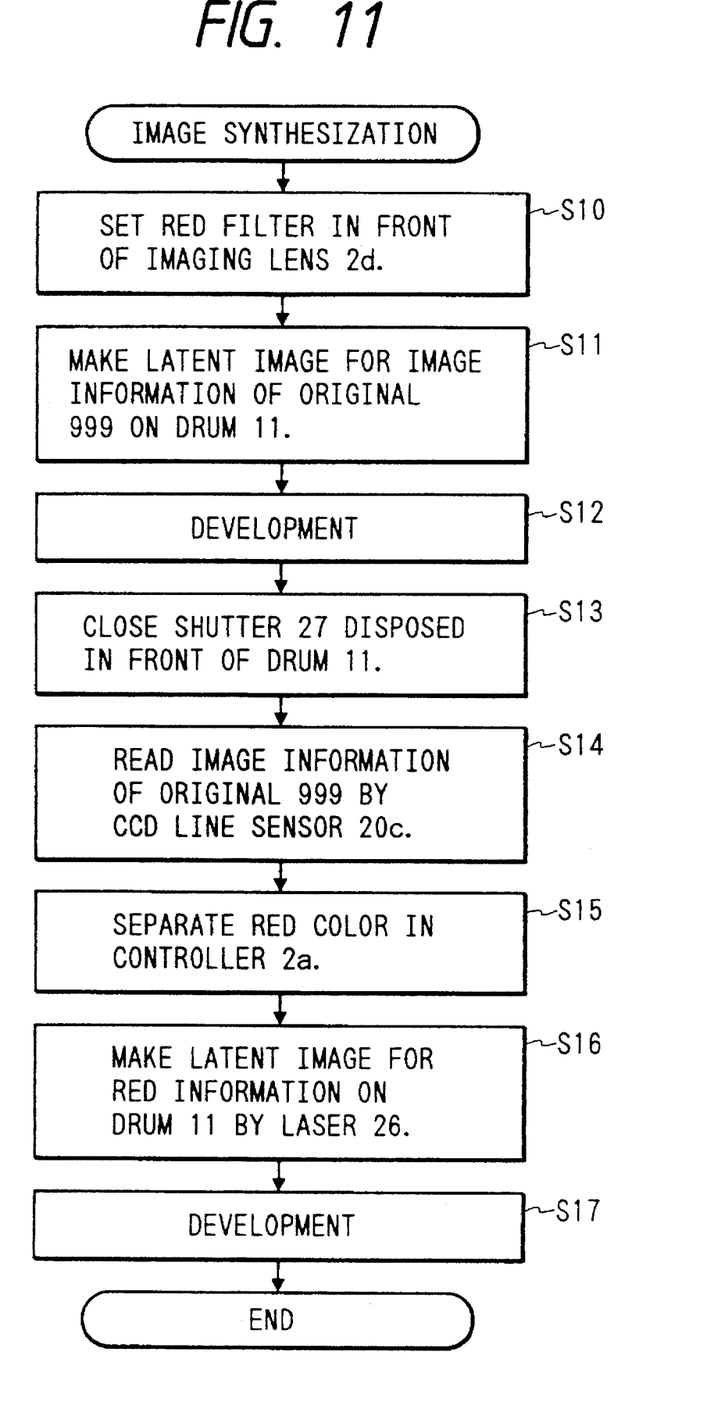
FIG. 11 is a flowchart showing a procedure: of a multiplex developing process in the embodiment.

FIG. 11 is a flowchart showing a whole procedure of multiplex developing processes which are executed in the embodiment.

First, the optical red filter 20d is set in front of the imaging lens 2d (step S10) in order to erase the red analog image in the original 999, namely, to separate the red image from the black image.

The original 999 is subsequently illuminated by the original exposing lamp 2c and scan mirror. The reflected light is led to the optical red filter 20d. The remaining image information from which only the red image information in the original 999 has been erased passes through the imaging lens 2d and is formed as an image onto the drum 11, so that the latent image corresponding to the image excluding the red image is formed (step S11). The latent image from which the red image has been eliminated is developed in black by the development unit 13a (step S12).

The developed black image is subsequently transferred to the cut sheet SH which is conveyed on the basis of the well-known electrophotographic process. After the black image was transferred, the cut sheet SH is separated by the separation charging device 16. After that, the toner image on the cut sheet is healed and pressed and fixed by the fixing device 19.

The conveying direction of the cut sheet SH on which the black image information has been recorded as mentioned above is controlled by the flapper 21. The cut sheet SH passes through the conveying paths 22 and 22a constructing a multiplex bus for the next image recording and is conveyed to the arranging position of the resist roller 12. The exposure shutter 27 arranged in front of the drum 11 is now closed (step S13) for preparation of the next red image recording (digital image recording). Consequently, the light information from the imaging lens 2d is not formed as an image onto the drum 11.

The original 999 is subsequently illuminated by the original exposing lamp 2c and scan mirror. The reflected light passes through the half mirror 20a and is formed as an image onto the line sensor 20c and is read (step S14). The electric signal which has been photoelectrically converted by the line sensor 20c as mentioned above is supplied to the controller 2a and the red color component is separated (step S15). The separated red image information is supplied as red recording information to the laser driver 260 and modulates and drives the semiconductor laser 26 constructing the digital image recording system. The laser beam emitted from the modulated laser 26 is scanned by the polygon mirror 25a and the latent image for red is formed onto the drum 11 (step S16). Subsequently, the latent image is developed in red by the development unit 13a (step S17). After that, the developed image is transferred to the cut sheet SH which has been fed again. The cut sheet SH after the red image was transferred is separated by the separation charging device 16 and the transferred image is fixed by the fixing device 19.

The cut sheet SH on which the image information has been multiplexed and synthesized and recorded in black and red is discharged onto the discharge tray 24 by the flapper 21 and the processing routine is completed.

If the filter color to separate the color in accordance with the development color which is set into the development unit 13a can be selected, the image corresponding to the development color can be synthesized as a digital image to the analog image and can be recorded.

That is, in addition to the print of two colors of black and red, a print of two colors of black and blue can be also similarly realized. A multicolor print of three colors of black, red, and blue, and further, four colors including the development color in addition to those three colors can be also performed.

According to the embodiment as described above, by executing the multiplex development, the copy of two colors of red and black can be executed.

Another embodiment of the invention will now be described.

Figure 12:
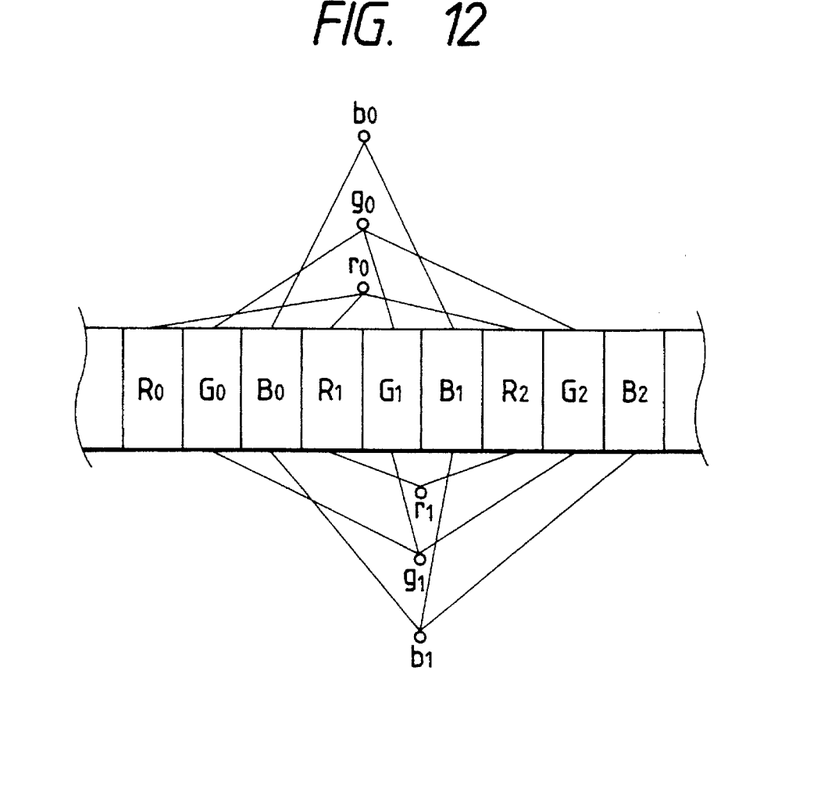
FIG. 12 is a diagram showing an inline sensor coated with filters of three colors of R, G, and B according to another embodiment of the invention.

FIG. 12 is a diagram showing an inline sensor coated with filters of three colors of red (R), green (G), and blue (B).

In such a line sensor, pixel arrangement arithmetic operations, are executed as follows. First, the signals from the sensors are subjected to the amplification, A/D conversion, and shading correction, so that the signals of the image data $R_0, G_0, B_0, R_1, G_1, B_1, R_2, G_2, B_2, \ldots$ are obtained. The pixels which are obtained from those signals by the arithmetic operations are set to $r_0, g_0,$ and $b_0$ at the boundary position of $R_1$ and $G_1$ and to $r_1, g_1,$ and $b_1$ at the boundary position of $G_1$ and $B_1$, The following arithmetic operations are executed.

$r_0 = \alpha R_1 + \beta R_2 + \gamma R_0$ $g_0 = \alpha G_1 + \beta G_0 + \gamma G_2$ $b_0 = \frac{1}{2}(B_0 + B_1)$ $r_1 = \frac{1}{2}(R_1 + R_2)$ $g_1 = \alpha G_1 + \beta G_2 + \gamma G_0$ $b_1 = \alpha B_1 + \beta B_0 + \gamma B_2$ where, $\alpha + \beta + \gamma \approx 1$ and $\alpha \geq \beta \geq \gamma$ The values of $\alpha$, $\beta$, and $\gamma$ are determined under the condition such that the MTF is matched.

By the above arithmetic operations, in a manner similar to the above embodiment, the positions of the pixels are made coincident and the MTF is matched. Moreover, the providing every three virtual pixels with respect to each pixel of each color, the resolution is raised to three times as high as that of the original image information.

According to the invention as described above, by executing the position correction arithmetic operations with respect to all of the color pixels which have been read from the original, the pixel positions can be corrected without a deviation and the MTF of each color pixel can be set to the same level, so that there is an effect such that the color can be discriminated with a high fidelity and a high image quality can be obtained.

In the above position correction arithmetic operations, by setting a plurality of virtual pixels about each color every pixel onto the boundaries of the different color pixels and by executing the interpolation arithmetic operations, not only the positions can be corrected but also the resolution can be improved. There is an effect such that a high image quality can be further obtained.

The invention is not limited to the above line sensor but can be also applied to any other sensors in which filters of different characteristics are alternately arranged.

The image forming means is not limited to the laser beam as mentioned above. For instance, it is also possible to use what is called a bubble jet printer using heads of the type to discharge a liquid droplet by using a film boiling due to a thermal energy.

For instance, an image edition such as color conversion or the like can be also performed by using the color image data extracted as mentioned above.

The present invention is not limited to the foregoing embodiments but many modifications and variations are possible within the spirit and scope of the appended claims of the invention.

What is claimed is:

1. An image processing apparatus comprising:

supplying means for supplying plural color component signals, each of which represents pixels of different spatial locations;

correcting means which is commonly used for correcting both of the spatial locations and spatial frequency characteristics of the plural color component signals, said correcting means performing correction on each of the plural color component signals so as to improve matching between the spatial frequency characteristics of each of the plural color component signals; and discriminating means for discriminating a predetermined color based on the plural color component signals corrected by said correcting means.

2. An apparatus according to claim 1, wherein said supplying means is comprised by a line sensor.

3. An apparatus according to claim 2, wherein said line sensor is formed by alternately arranging a plurality of filters of different characteristics on one line.

4. An apparatus according to claim 1, wherein said correcting means corrects the spatial locations and the spatial frequency characteristics of the color component signals by pixel interpolation arithmetic operations.

5. An apparatus according to claim 1, further having means for performing a color discrimination by using the color component signals corrected by said correcting means.

6. An image procession method comprising the steps of:

supplying plural color component signals, each of which represents pixels of different spatial locations;

correcting both of the spatial locations and spatial frequency characteristics of the plural color component signals, said correcting step being performed on each of the plural color component signals so as to improve matching between the spatial frequency characteristics of each of the plural color component signals; and discriminating a predetermined color based on the plural color component signals corrected in said correcting step.

7. An image processing apparatus comprising:

a line sensor for generating plural color component signals, said line sensor being formed by alternately arranging a plurality of filters of different characteristics corresponding to said plural color component signals on one line;

correcting means which is commonly used for correcting both of spatial locations and spatial frequency characteristics of the plural color component signals, said correcting means performing correction on each of the plural color component signals so as to improve matching between spatial frequency characteristics of each of the plural color component signals; and discriminating means for discriminating a predetermined color based on the plural color component signals corrected by said correcting means.

8. An apparatus according to claim 7, wherein said correcting means corrects the spatial locations and the spatial frequency characteristics of the color component signals by pixel interpolation arithmetic operations.

9. An apparatus according to claim 7, further having means for performing a color discrimination by using the color component signals corrected by said correcting means.

10. An image processing apparatus comprising:

scanning means for scanning an original and for generating plural color component signals, each of which represents pixels of different spatial locations;

correcting means which is commonly used for correcting both of the spatial locations and spatial frequency characteristics of the plural color component signals;

discriminating means for discriminating a predetermined color based on the plural color component signals corrected by said correcting means; and processing means for processing the plural color component signals corrected by said correcting means in accordance with discriminating results of said discriminating means and for generating a reproduction signal, wherein said correcting means performs correction on each of the plural color component signals so as to improve matching between the spatial frequency characteristics of each of the plural color component signals.

11. An apparatus according to claim 10, wherein said correcting means corrects the spatial locations and the spatial frequency characteristics of the color component signals by pixel interpolation arithmetic operations.

12. An apparatus according to claim 10, wherein said processing means includes color discriminating means for discriminating a color represented by the color component signals.

13. An apparatus according to claim 10, further having image forming means for forming an image in accordance with the reproduction signal generated by said processing means.

14. An apparatus according to claim 13, wherein said image forming means forms an image by using a laser beam.

15. An apparatus according to claim 13, wherein said image forming means has heads of the type for emitting liquid droplets by using a film boiling by a thermal energy.

* * * * *